United States Patent
Lin et al.

(10) Patent No.: US 7,923,525 B2
(45) Date of Patent: Apr. 12, 2011

(54) POLYESTER RESIN AND FABRICATION METHOD THEREOF

(75) Inventors: Chih-Hsiang Lin, Taipei (TW); Hsin-Ching Kao, Hsinchu County (TW)

(73) Assignee: Industrial Technology Research Institute, Hsinchu County (TW)

( * ) Notice: Subject to any disclaimer, the term of this patent is extended or adjusted under 35 U.S.C. 154(b) by 88 days.

(21) Appl. No.: 12/468,010

(22) Filed: May 18, 2009

(65) Prior Publication Data

US 2010/0197883 A1     Aug. 5, 2010

(30) Foreign Application Priority Data

Feb. 2, 2009 (TW) ................................ 98103200 A

(51) Int. Cl.
*C08G 63/02* (2006.01)
*C08G 64/00* (2006.01)

(52) U.S. Cl. .............. 528/176; 264/176.1; 264/219; 428/35.7; 428/40.1; 428/480; 528/179; 528/180; 528/182; 528/194

(58) Field of Classification Search ............... 264/176.1, 264/219; 428/35.7, 401, 480; 528/179, 180, 528/182, 194
See application file for complete search history.

(56) References Cited

U.S. PATENT DOCUMENTS 5,164,478 A * 11/1992 Lee et al. ............... 528/481
* cited by examiner

*Primary Examiner* — Terressa M Boykin
(74) *Attorney, Agent, or Firm* — Pai Patent & Trademark Law Firm; Chao-Chang David Pai

(57) ABSTRACT

A polyester resin and a fabrication method thereof are provided. The fabrication method includes providing a diphenol monomer and a diacid monomer. The diphenol monomer is acetylated and then melt pre-polymerized with diacid monomer to form a pre-polymer. Then, the pre-polymer is polymerized by solid state polymerization to form a heat-resistant and transparent polyester resin.

26 Claims, 2 Drawing Sheets

POLYESTER RESIN AND FABRICATION METHOD THEREOF

CROSS REFERENCE TO RELATED APPLICATIONS

This Application claims priority of Taiwan Patent Application No. 98103200, filed on Feb. 2, 2009, the entirety of which is incorporated by reference herein.

BACKGROUND OF THE INVENTION

1. Field of the Invention

The invention relates to a polyester resin, and more particularly to a polyester resin with heat-resistance and transparency and a fabrication method thereof.

2. Description of the Related Art

Generally, there are three conventional methods in which polyester resin is fabricated: interfacial polymerization, solution polymerization and melt polymerization. The interfacial polymerization method is performed at an interface between an organic solution and a water solution which are incompatible with each other. A polyarylate (PAR) with a high molecular weight can be fabricated using the interfacial polymerization method. However, disadvantages of using the interfacial polymerization method include: having complicated processes; relatively large power and water requirements; and requirement to use volatile organic compounds (VOC). Therefore, the interfacial polymerization method is environmentally un-friendly. Meanwhile, using the solution polymerization method to fabricate polyarylate (PAR) requires an organic solvent. A disadvantage of using the solution polymerization method includes difficulty in efficiently enhancing the molecular weight of the fabricated polyarylate (PAR). Therefore, physical and mechanical properties of the polyarylate (PAR) fabricated by the solution polymerization method are unsatisfactory.

U.S. Pat. No. 5,164,478 discloses utilizing a melt polymerization method to fabricate a polyester resin. In this method, a diphenol monomer and a diacid monomer are used to form the polyester resin by high temperature melt polymerization. However, the high temperature (above 250° C.) process step required for polymerization of the polyester resin, results in a yellowish-colored polyester resin. Additionally, the diphenol monomer used in this method is a bisphenol A monomer, which does not effectively enhance the glass transition temperature (Tg) of the polyester resin. Thus, hindering high heat-resistance and transparency of the fabricated polyester resin.

Therefore, a polyester resin and a fabrication method thereof which can achieve high heat-resistance and transparency are desired.

BRIEF SUMMARY OF THE INVENTION

The invention provides a polyester resin of Formula (I):

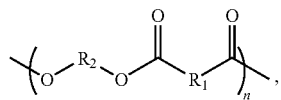

Formula (I)

wherein $R_1$ is naphthalene, phenyl, butyl, hexyl or combinations thereof. $R_2$ is

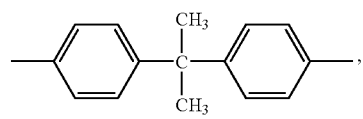

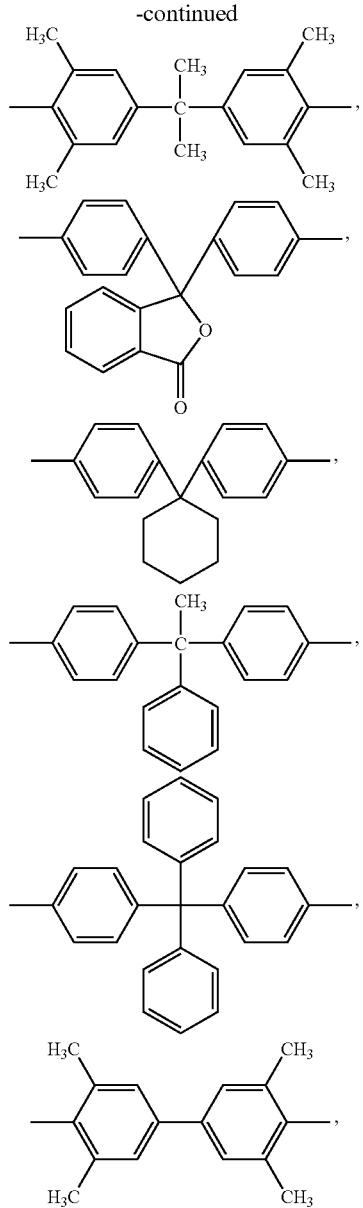

or combinations thereof, and n is the number of repeated units. The polyester resin has a molecular weight of 10000 to 30000.

The invention further provides a method for forming a polyester resin, comprising providing a diphenol monomer and a diacid monomer, performing an acetylation to the diphenol monomer and then performing a melt pre-polymerization to the acetylated diphenol monomer and the diacid monomer to form a pre-polymer, and performing a solid state polymerization to the pre-polymer to form the polyester resin.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

Figure 1:
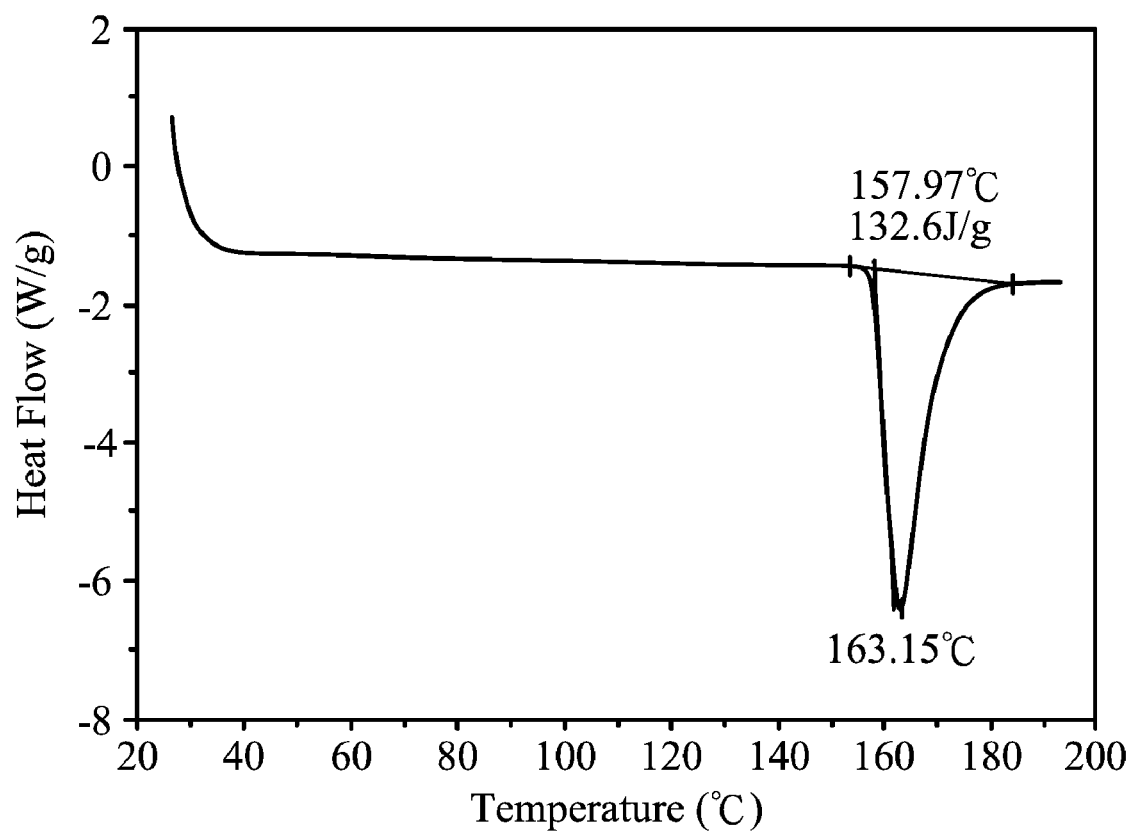
FIG. 1 shows a measurement result of a bisphenol A monomer before acetylation by a differential scanning calorimetry (DSC)

The following description is of the best-contemplated mode of carrying out the invention. The description is provided for illustrating the general principles of the invention and is not meant to be limiting. The scope of the invention is best determined by reference to the appended claims.

The invention utilizes melt polymerization and solid state polymerization to form a high heat-resistant and transparent polyester resin. First, a diphenol monomer is acetylated in acetic anhydride to form acetate, and then the acetate is reacted with a diacid monomer in a polymerization tank by melt polymerization to form a pre-polymer. Then, the pre-polymer is polymerized by solid state polymerization under a vacuum environment and at a temperature below a melting point of the polymer to enhance a molecular weight thereof to form the polyester resin. The polyester resin fabricated by the method of the invention does not result in a yellowish color, and physical and mechanical properties thereof are improved when compared to prior art. Moreover, the polyester resin fabricated by the method of the invention has high glass transition temperature and can satisfy requirements for a polyester resin with high heat resistance and transparency. In addition, the polyester resin fabricated by the method of the invention eliminates problems associated with volatile organic compounds (VOC), such that it is environmentally friendly.

The polyester resin of the invention can be represented by Formula (I):

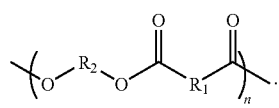

Formula (I)

$R_1$ of Formula (I) can be naphthalene, phenyl, butyl, hexyl or combinations thereof. The naphthalene may be 1,4-naphthalene, 2,3-naphathalene, 2,6-naphathalene or combinations thereof. The phenyl may be 1,2-phenyl, 1,3phenyl, 1,4-phenyl, or combinations thereof. Under the condition that an easterification condensation is not influenced, other phenyl and naphthalene substitute positions can be functional groups such as alkyl or halogen. $R_2$ of Formula (I) can be functional groups as below or combinations thereof:

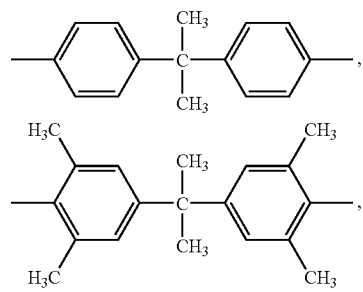

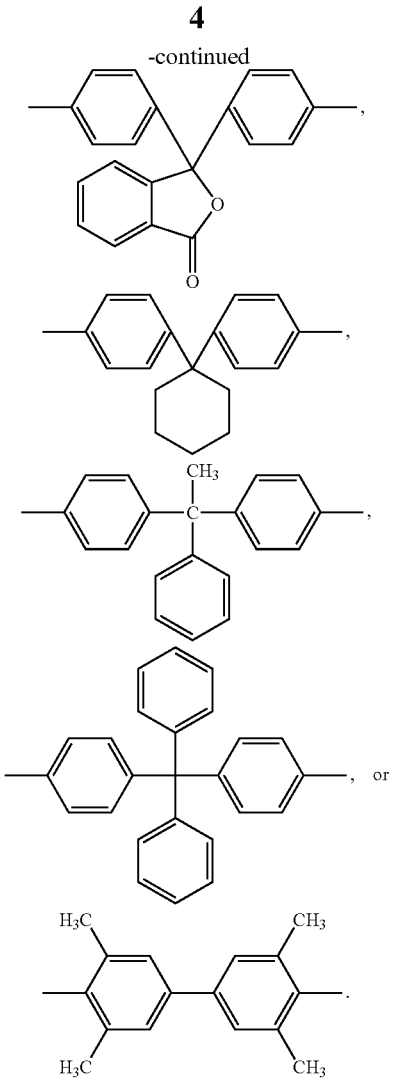

n of Formula (I) is the number of repeated units and a molecular weight of the polyester resin is between 10000 to 30000.

In an embodiment of a method for forming the polyester resin of the invention, a diphenol monomer, acetic anhydride and a diacid monomer are put into a reaction tank together. The diphenol monomer is reacted with acetic anhydride first by acetylation to form an acetate compound. Then, the acetate compound is reacted with the diacid monomer by pre-polymerization to form a pre-polymer polyester resin. The acetylation and the pre-polymerization are performed in a one step process. After the acetylation is completed, a product thereof can be directly used for pre-polymerization and does not need to be first purified. Therefore, the method for fabricating the polyester resin of the invention has simplified processes. Additionally, because acetic anhydride has excellent solubility, homogeneous reaction during melt polymerization with the aromatic diacid monomer is efficient, such that the method of the invention is suitable for a diphenol monomer with a bulky molecular structure and heat resistance of the polyester resin is enhanced, achieving a polyester resin with a glass transition temperature of 190 to 290° C.

The diphenol monomer may be bisphenol A (Bis A), tetramethyl-bisphenol A (TM-Bis A), phenolphthalein (Bis P), bisphenol Z (Bis Z), 1,1-bis(4-hydroxyphenyl)-1-phenyl ethane (triphenyl; Bis AP), 4-4'-dihydroxytetraphenyl methane (tetraphenyl; Bis TP), tetramethyl-biphenol (TM-BP) or combinations thereof, which have molecular structures as below:

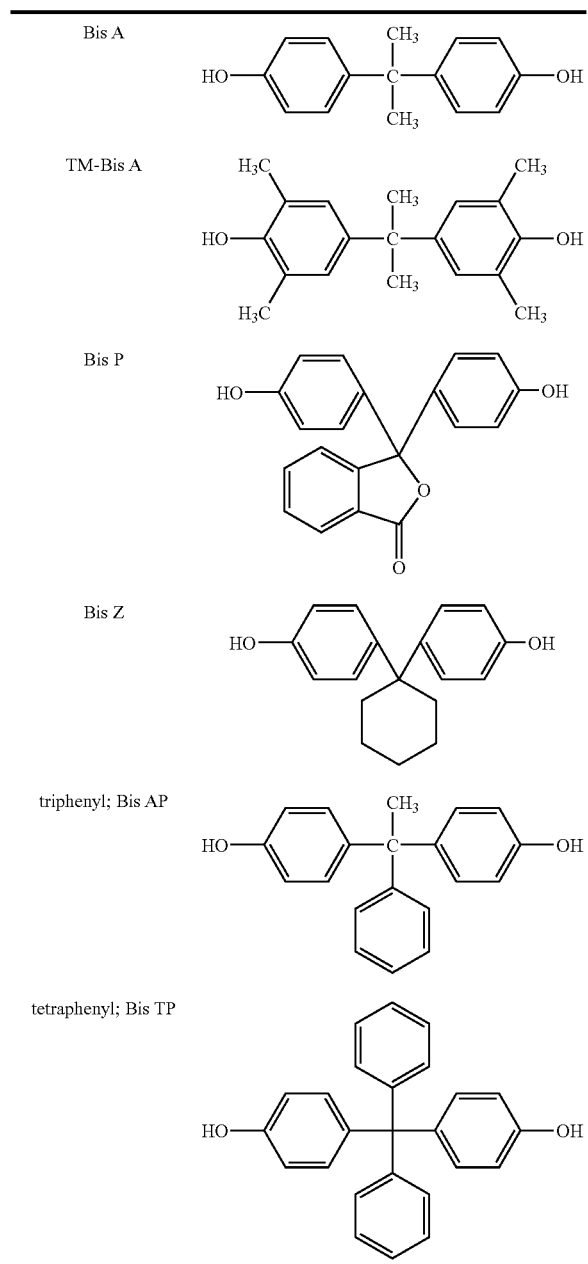

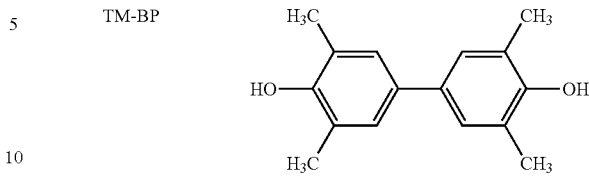

The glass transition temperature of the polyester resin can be adjusted between 190 and 290° C. by selecting and combining different diphenol monomers.

The diacid monomer can be naphthalene dicarboxylic acid, benzene dicarboxylic acid, succinic acid, adipic acid or combinations thereof. The naphthalene may be 1,4-naphthalene, 2,3-naphathalene, 2,6-naphathalene or combinations thereof. The phenyl may be 1,2-phenyl, 1,3phenyl, 1,4-phenyl, or combinations thereof.

In an embodiment of the invention, the diacid monomer can be a combination of isophthalic acid (IPA) and terephthalic acid (TPA), wherein a mole ratio of IPA to TPA may be 0.75:0.25 to 0.25:0.75, and a mole ratio of 0.5:0.5 is preferred.

In an embodiment of the invention, the polyester resin can be synthesized by the reactions of acetylation and pre-polymerization below, taking bisphenol A for the diphenol monomer, and a combination of IPA and TPA for the diacid monomer as an example:

Acetylation:

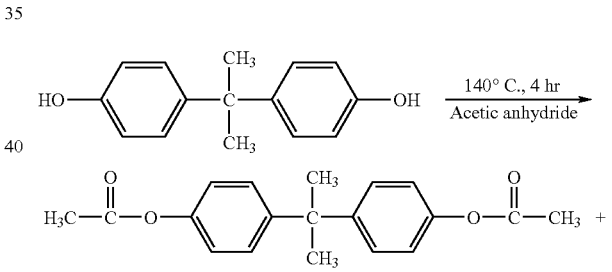

CH$_3$COOH;

and

Pre-polymerization:

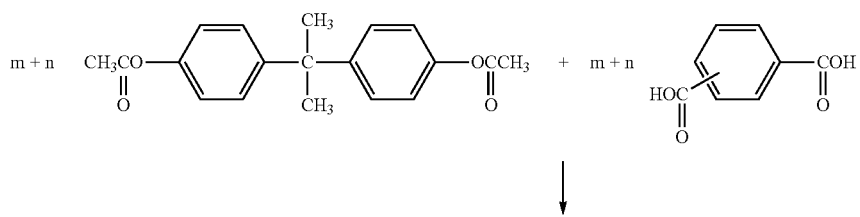

↓

-continued

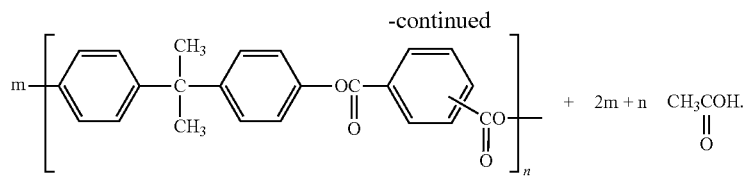

In the above synthesis reactions, the acetylation temperature is usually about 130 to 160° C., wherein 140° C. is preferred. A by-product of the acetic acid produced from the reactions of acetylation and pre-polymerization is continuously evaporated out by a reaction system. Because polyester resin turns a yellowish color under high temperatures (above 250° C.) during pre-polymerization, in an embodiment of the invention, the pre-polymerization temperature is controlled at 180 to 280° C., wherein 200 to 260° C. is preferred, until a pre-polymer has an intrinsic viscosity (IV) of about 0.2 to 0.5 dl/g, wherein 0.3 to 0.4 dl/g is preferred.

Moreover, in an embodiment of the invention, a diluent with a high boiling point of about 180 to 250° C. can be added in the fabrication processes of the polyester resin. The diluent may be diphenyl ether, dimethyl sulfone or diisopropyl benzene. The diluent is useful to disperse heat during pre-polymerization and can reduce yellowing of the polyester resin. The diluent can be added by a ratio of 20 to 40% by weight based on 100% by weight of the polyester resin, wherein 30 to 35% by weight is preferred. Meanwhile, an organic catalyst can also be added during the fabrication processes of the polyester resin. The organic catalyst may be toluenesulfonic acid or 4-dimethylaminopyridine. The organic catalyst can be added by a ratio of 100 to 600 ppm by weight based on 100% by weight of the polyester resin, wherein 300 to 350 ppm by weight is preferred.

Next, the pre-polymer of the invention is polymerized by solid state polymerization under a vacuum and at a temperature below a melting point of the polymer to enhance a molecular weight thereof, such that physical and mechanical properties of the polyester resin are improved when compared to prior art and the polyester resin does not turn a yellowish color. The solid state polymerization temperature is usually about 150 to 250° C., wherein 180 to 210° C. is preferred, until the polyester resin has an intrinsic viscosity (IV) of about 0.6 to 0.8 dl/g. A polyester resin fabricated from the method of the invention can have a glass transition temperature (Tg) of 190 to 290° C. and high heat resistance. In addition, the polyester resin is a transparent or slightly yellow material which has a color index b below 3.

The polyester resin of the invention and the fabrication method thereof are described in detail as below:

Example 1

Acetylation

Figure 2:
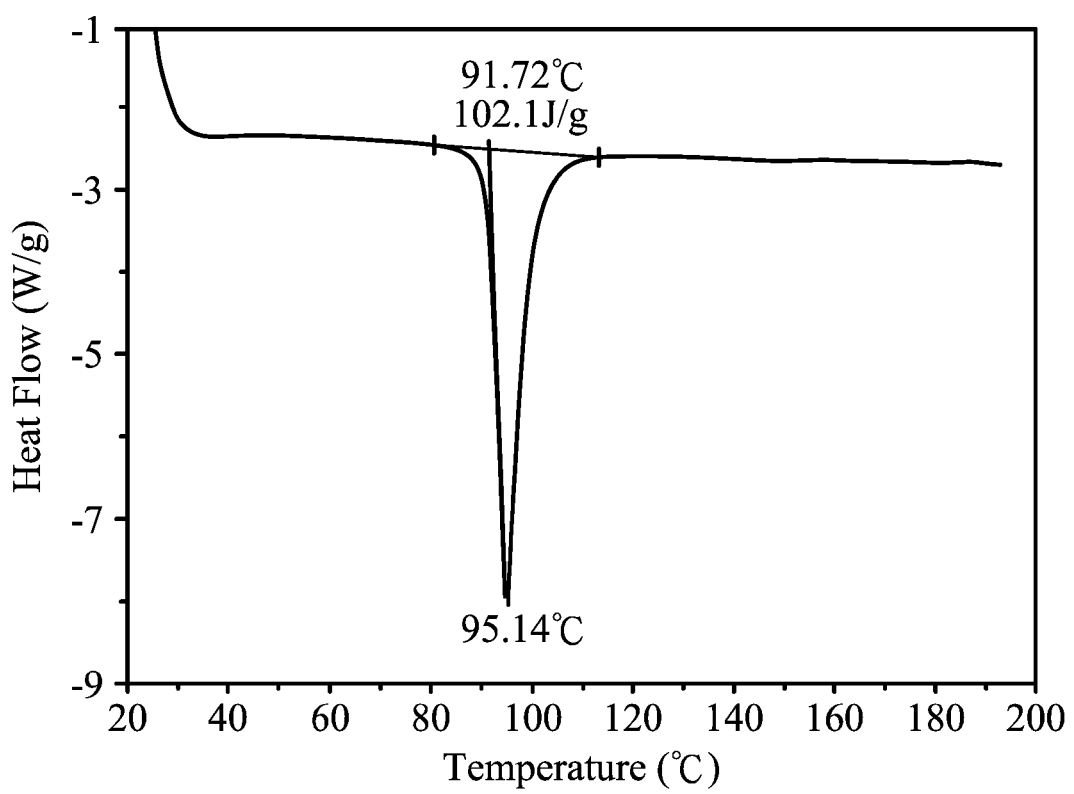
FIG. 2 shows a measurement result of a bisphenol A monomer after acetylation by a differential scanning calorimetry (DSC).

A bisphenol A (Bis A) monomer and an acetic anhydride were put into a reaction vessel with a mole ratio of 1:1.5. After adding 0.001 mole of a toluenesulfonic acid organic catalyst under a nitrogen gas environment, the mixture was heated to 140° C., and heat refluxed for 4 hours for acetylation, thus forming a bisphenol A diacetate monomer. Before and after acetylation, the bisphenol A monomers were measured by a differential scanning calorimetry (DSC) to obtain melting points thereof. The measurement results are shown as FIG. 1 and FIG. 2 respectively. Before acetylation, the melting point of the bisphenol A monomer was 163.2° C. After the acetylation, soft-chain segments were added into the bisphenol A monomer, such that the melting point was reduced to 95.1° C. Thus, as shown from FIG. 1 and FIG. 2, acetylation was successfully preformed.

Example 2

Synthesis of a Heat-Resistant and Transparent Polymer Resin with Tg of 190° C.

The bisphenol A diacetate monomer obtained from the acetylation of the bisphenol A monomer of Example 1 was mixed with a diacid monomer of a combination of TPA and IPA. A mole ratio of the bisphenol A diacetate monomer to TPA and IPA was 2:1:1. Next, 20 to 40% by weight of a diluent of diphenyl ether was added to the mixture under a nitrogen gas environment, and the mixture was heated to 220° C. for one hour, until an evaporation amount (theorized value) of the acetate was achieved. Then, heating was performed at 280° C. for one hour, and then a pumping process was performed to achieve a vacuum for 30 to 60 minutes, wherein a pre-polymer was obtained following pre-polymerization. The pre-polymer had a Tg of 177.6° C., and an IV thereof was 0.26 dl/g. Next, the pre-polymer was polymerized by solid state polymerization to enhance a molecular weight and a Tg thereof to obtain a polyester resin. After the solid state polymerization, the Tg of the polyester resin of Example 1 was 190.9° C., and the IV thereof was 0.64 dl/g.

Examples 3-5

Synthesis of Heat-Resistant and Transparent Polyester Resins with Tg of 220° C.

Polymerization process of the polyester resins of Examples 3-5 were the same as Examples 1-2. The difference between Examples 3-5 and Examples 1-2 were that the diphenol monomers of Examples 3-5 were combinations of Bis A and Bis Z monomers. The combinations of the diphenol monomers, and Tg and IV of polyester resins obtained after the solid state polymerization of Examples 3-5 are shown as below:

|  | mole ratio of Bis A/Bis Z | Tg(° C.) after solid state polymerization | IV(dl/g) after solid state polymerization | color |
|---|---|---|---|---|
| Example 3 | 100/0 | 203 | 0.64 | transparent |
| Example 4 | 0/100 | 222 | 0.63 | transparent |
| Example 5 | 20/80 | 220 | 0.60 | transparent |

Examples 6-7

Synthesis of Heat-Resistant and Transparent Polyester Resins with Tg of 250° C.

Polymerization process of the polyester resins of Examples 6-7 were the same as Examples 1-2. The difference between Examples 6-7 and Examples 1-2 were that the diphenol monomers of Examples 6-7 were combinations of Bis A and Bis AP monomers. The combinations of the diphenol monomers, and Tg and IV of polyester resins obtained after the solid state polymerization of Examples 6-7 are shown as below:

| | mole ratio of Bis A/Bis AP | Tg(° C.) after solid state polymerization | IV(dl/g) after solid state polymerization | color |
|---|---|---|---|---|
| Example 6 | 0/100 | 250 | 0.53 | transparent |
| Example 7 | 50/50 | 232 | 0.58 | transparent |

Examples 8-10

Synthesis of Heat-Resistant and Transparent Polyester Resins with Tg of 290° C.

Polymerization process of the polyester resins of Examples 8-10 were the same as Examples 1-2. The difference between Examples 3-5 and Examples 1-2 were that the diphenol monomers of Examples 8-10 were combinations of Bis Z and Bis P monomers. The combinations of the diphenol monomers, and Tg and IV of polyester resins obtained after the solid state polymerization of Examples 8-10 are shown as below:

| | mole ratio of Bis Z/Bis P | Tg(° C.) after solid state polymerization | IV(dl/g) after solid state polymerization | color |
|---|---|---|---|---|
| Example 8 | 100/0 | 222 | 0.58 | transparent |
| Example 9 | 50/50 | 264 | 0.61 | transparent |
| Example 10 | 0/100 | 290 | 0.60 | transparent |

As shown in the results of Examples 3-5, utilizing the diphenol monomer of Bis Z to modify a polyester resin, a Tg of the polyester resin can be enhanced to 222° C. As shown in the results of Examples 6-7, utilizing the diphenol monomer of Bis AP to modify a polyester resin, a Tg of the polyester resin can be enhanced to 250° C. As shown in the results of Examples 8-10, utilizing the diphenol monomer of Bis P to modify a polyester resin, a Tg of the polyester resin can be enhanced to 290° C. Additionally, the polyester resins fabricated in the above Examples were transparent, with no yellowish coloring.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polyester resin of Formula (I):

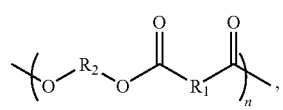

wherein $R_1$ is naphthalene, butyl, hexyl or combinations thereof;

$R_2$ is:

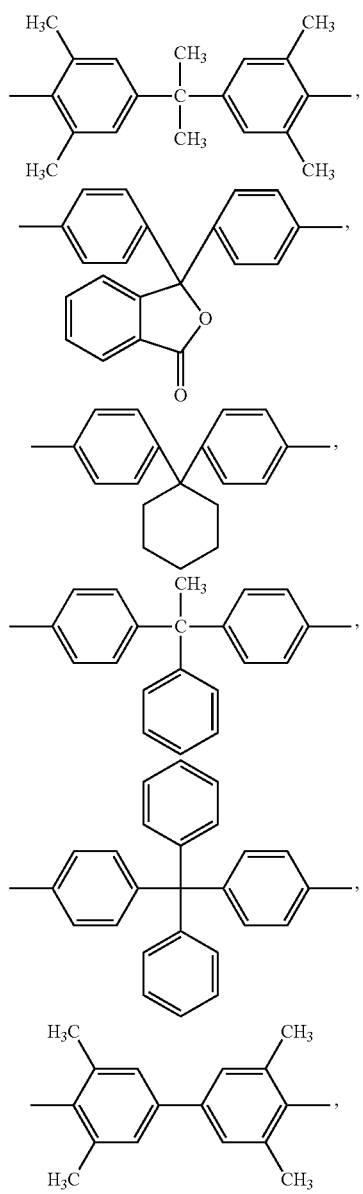

or combinations thereof, and n is the number of repeated units.

2. The polyester resin as claimed in claim 1, wherein the naphthalene comprises 1,4-naphthalene, 2,3-naphathalene, 2,6-naphathalene or combinations thereof.

3. The polyester resin as claimed in claim 1, having a glass transition temperature (Tg) of 190 to 290° C., and wherein the polyester resin is a transparent polyester resin.

4. A method for forming a polyester resin, comprising:

providing a diphenol monomer and performing an acetylation to the diphenol monomer to form an acetylated diphenol monomer;

providing a diacid monomer;

performing a melt pre-polymerization at a temperature of 180 to 280° C. to the acetylated diphenol monomer and the diacid monomer to form a pre-polymer; and performing a solid state polymerization at a temperature of 150 to 250° C. to the pre-polymer to form the polyester resin.

5. The method as claimed in claim 4, wherein the diphenol monomer comprises:

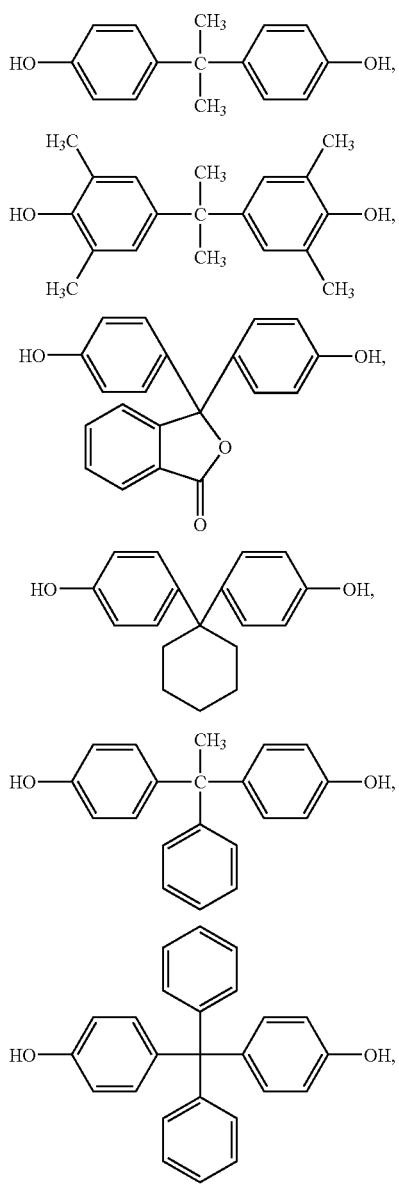

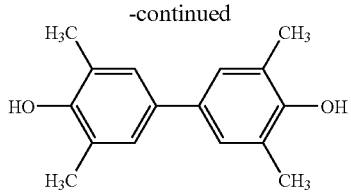

or combinations thereof.

6. The method as claimed in claim 4, wherein the diacid monomer comprises naphthalene dicarboxylic acid, benzene dicarboxylic acid, succinic acid, adipic acid or combinations thereof.

7. The method as claimed in claim 6, wherein the naphthalene comprises 1,4-naphthalene, 2,3-naphathalene, 2,6-naphathalene or combinations thereof, and the phenyl comprises 1,2-phenyl, 1,3-phenyl, 1,4-phenyl, or combinations thereof.

8. The method as claimed in claim 4, wherein the diacid monomer is a combination of isophthalic acid and terephthalic acid, and the mole ratio of isophthalic acid to terephthalic acid is between 0.75:0.25 and 0.25:0.75.

9. The method as claimed in claim 8, wherein the mole ratio of isophthalic acid to terephthalic acid is 0.5:0.5.

10. The method as claimed in claim 4, wherein the acetylation comprises being performed in acetic anhydride, such that the diphenol monomer is acetylated to form acetate, and the acetylation is performed at a temperature of 130 to 160° C.

11. The method as claimed in claim 4, wherein the pre-polymer has an intrinsic viscosity of 0.2 to 0.5 dl/g, and the polyester resin has an intrinsic viscosity of 0.6 to 0.8 dl/g.

12. The method as claimed in claim 4, wherein the melt pre-polymerization further comprises adding a diluent and the diluent has a boiling point of 180 to 250° C.

13. The method as claimed in claim 12, wherein the diluent comprises diphenyl ether, dimethyl sulfone or diisopropyl benzene.

14. The method as claimed in claim 12, wherein an added ratio of the diluent to 100% by weight of the polyester resin is between 20 to 40% by weight.

15. The method as claimed in claim 4, wherein the melt pre-polymerization further comprises adding an organic catalyst.

16. The method as claimed in claim 15, wherein the organic catalyst comprises toluenesulfonic acid or 4-dimethylaminopyridine.

17. The method as claimed in claim 15, wherein an added ratio of the organic catalyst to 100% by weight of the polyester resin is between 100 to 600 ppm by weight.

18. The method as claimed in claim 4, wherein the polyester resin has a glass transition temperature (Tg) of 190 to 290° C., and the polyester resin is a transparent polyester resin.

19. The polyester resin as claimed in claim 1, wherein $R_2$ is a combination of

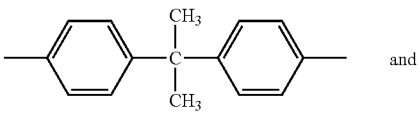

-continued

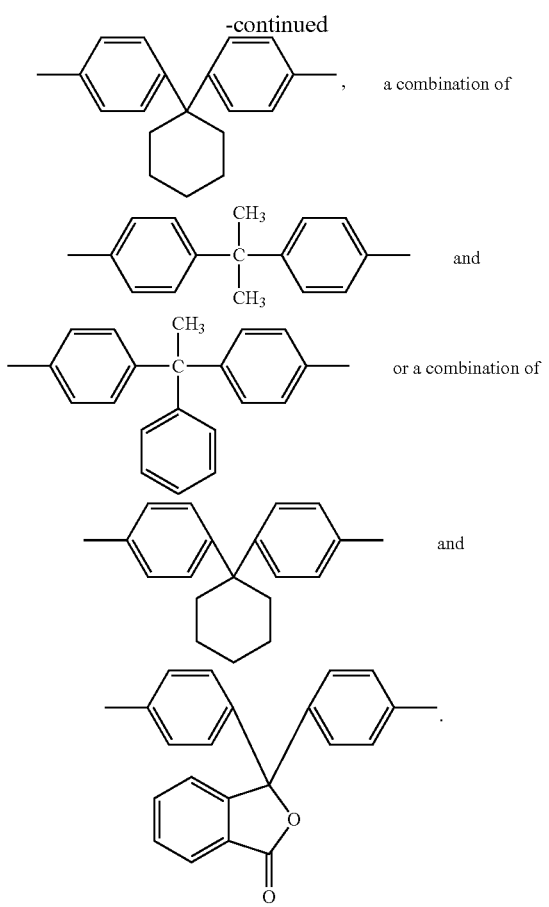

20. The method as claimed in claim 4, wherein the diphenol monomer is a

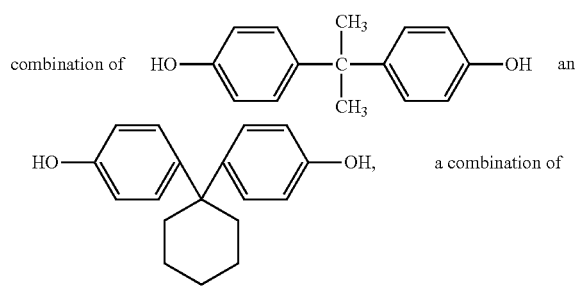

-continued

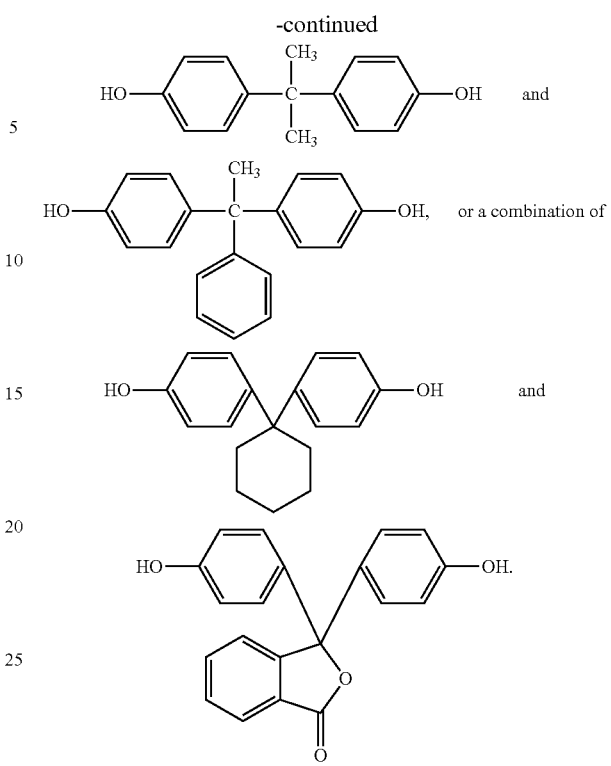

21. The polyester resin formed by the method as claimed in claim 12.

22. The polyester resin formed by the method as claimed in claim 13.

23. The polyester resin formed by the method as claimed in claim 14.

24. The polyester resin formed by the method as claimed in claim 15.

25. The polyester resin formed by the method as claimed in claim 16.

26. The polyester resin formed by the method as claimed in claim 17.

* * * * *